United States Patent [19]

Arya

[11] 4,066,534
[45] Jan. 3, 1978

[54] APPARATUS AND METHOD FOR ASSEMBLING FUEL ELEMENTS

[75] Inventor: Satya Prakash Arya, San Diego, Calif.

[73] Assignee: General Atomic Company, San Diego, Calif.

[21] Appl. No.: 674,680

[22] Filed: Apr. 7, 1976

[51] Int. Cl.² .............................................. B07C 5/04
[52] U.S. Cl. ................................... 209/82; 209/74 R; 209/111.7 R; 250/560; 214/1 BT
[58] Field of Search .................. 209/73, 74 R, 111.7, 209/82; 250/560; 214/1 BT

[56] References Cited

U.S. PATENT DOCUMENTS

| | | | |
|---|---|---|---|
| 3,349,905 | 10/1967 | Crawford | 250/560 |
| 3,774,040 | 11/1973 | Stephanos | 250/560 |
| 3,907,123 | 5/1973 | Howell | 214/1 BB |

*Primary Examiner*—Robert B. Reeves
*Assistant Examiner*—H. Grant Skaggs
*Attorney, Agent, or Firm*—Fitch, Even, Tabin & Luedeka

[57] ABSTRACT

A nuclear fuel element assembling method and apparatus is preferably operable under programmed control unit to receive fuel rods from storage, arrange them into axially aligned stacks of closely monitored length, and transfer the stacks of fuel rods to a loading device for insertion into longitudinal passages in the fuel elements. In order to handle large numbers of one or more classifications of fuel rods or other cylindrical parts, the assembling apparatus includes at least two feed troughs each formed by a pair of screw members with a movable table having a plurality of stacking troughs for alignment with the feed troughs and with a conveyor for delivering the stacks to the loading device, the fuel rods being moved along the stacking troughs upon a fluid cushion.

23 Claims, 6 Drawing Figures

APPARATUS AND METHOD FOR ASSEMBLING FUEL ELEMENTS

BACKGROUND OF THE INVENTION

The present invention relates to an assembling apparatus and method for forming stacks of fuel rods prior to their being loaded into nuclear fuel elements for use in nuclear reactors. More particularly, the invention relates to such an assembling apparatus and method wherein the fuel rods may be received from storage, arranged into stacks which are inspected and selectively transferred to a fuel element loading system under programmed control. The assembling apparatus includes a stacking assembly wherein arrays of side-to-side arranged fuel rods or other cylindrical parts may be rapidly formed into stacks of selected numbers of axially arranged parts suitable for further processing.

Nuclear reactors commonly employ large numbers of fuel rods formed from fissionable material, the fuel rods often being supported in longitudinal passages within a plurality of fuel elements.

In gas-cooled reactors, for example, the reactor core is made up of a plurality of columns of separate fuel elements or blocks. The fuel elements contain a plurality of longitudinal passages which are open at one end. Stacks of axially arranged fuel rods are inserted into each of the longitudinal holes or passages which are adjacent vertical passages for passing a gas coolant through the core. The fuel block may also be commonly provided with additional passages permitting the insertion of control rods as well as grappling devices for raising and lowering the fuel elements in refueling operation.

Due to hazardous radiation, it is necessary to load the fuel rods into the fuel elements by automated or programmed control means in a radiation filtered environment. A number of systems have been devised for this purpose. For example, a copending patent applicaion, Ser. No. 603,531, filed on Aug. 11, 1975 and entitled FUEL ELEMENT LOADING DEVICE, and assigned to the assignee of the present invention, describes a preferred fuel element loading device of a type particularly contemplated for use as an element of the present assembly apparatus.

In order to permit rapid and efficient operation of such loading devices, it is necessary to provide suitable means for transferring the fuel rods from storage and forming them into axially aligned stacks each having a selected number of fuel rods. The actual number of fuel rods within each stack and even the particular fuel blend for the various stacks may vary depending upon the particular application. In addition, it is important that the length of each fuel rod stack be accurately monitored to determine that its length is within close tolerances before being loaded into a longitundinal passage of a fuel element.

The present assembly apparatus also particularly contemplates use of a unit capable of rapidly transferring large numbers of fuel rods, that unit being described in a copending application, Ser. No. 658,391, filed Feb. 17, 1976 and entitled METHOD AND APPARATUS FOR CONTAINER LOADING AND UNLOADING and assigned to the assignee of the present invention.

SUMMARY OF THE INVENTION

Accordingly, it is an object of the present invention to provide a method and apparatus for rapidly and efficiently forming large numbers of nuclear fuel rods into suitable axially aligned stacks and loading them into nuclear fuel elements.

It is another object of the invention to provide such an assembling apparatus including a stacking assembly having multiple stacking troughs, each of the stacking troughs being adapted to receive a stack of axially aligned fuel rods suitable for passage to a nuclear fuel element loading device.

It is a more specific object of the invention to provide such an assembling apparatus wherein the length of each fuel rod is monitored, the fuel rod stack being transferred to the loading device only if its length is within acceptable limits.

It is an even further object of the invention to provide such an assembling apparatus which is capable of programmed operation for receiving fuel rods of different blends from storage, forming stacks of selected numbers of fuel rods and monitoring the lengths of the fuel rod stacks, acceptable fuel rod stacks thereafter being transferred to a nuclear fuel element loading device.

It is also an object of the present invention to provide a stacking assembly which is useful for the handling of such fuel rods or other cylindrical parts wherein arrays of side-to-side arranged parts may be received with selected numbers of the parts being rapidly and efficiently arranged into axially aligned stacks, the stacking assembly being simultaneously capable of delivering previously formed stacks to a suitable conveyor means.

It is another specific object of the invention to provide such an apparatus or assembly where the fuel rods or other cylindrical parts are moved laterally by parallel screw elements and axially upon a fluid or air cushion.

Additional objects and advantages of the invention are made apparent in the following description having reference to the accompanying drawings.

DESCRIPTION OF THE PREFERRED EMBODIMENT

Figure 1:
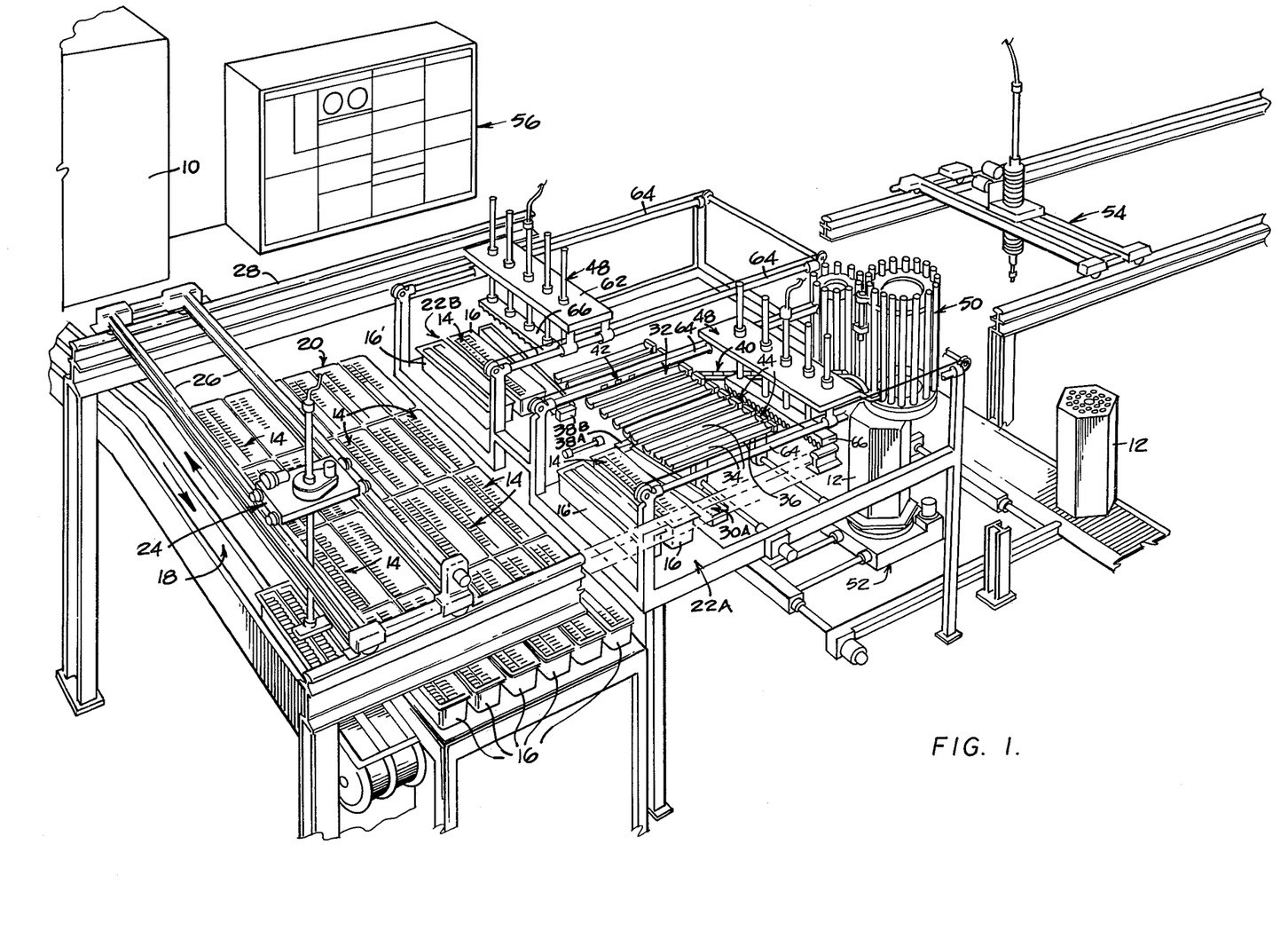
FIG. 1 is an isometric view of the present assembling apparatus adapted to receive fuel rods from a suitable storge container and completing assembly of nuclear fuel elements under programmed control.

The overall fuel element assembling apparatus of the present invention may be best seen in FIG. 1. As indicated above, the assembling apparatus is contemplated for receiving fuel rods from a storage vault 10 and forming them into stacks suitable for loading into fuel elements such as that indicated at 12. Due to the relative complexity of the assembling apparatus, its various subassemblies are first summarized below followed by a more detailed description particularly in connection with the feeding and stacking portions of the assembly apparatus.

Figure 2:
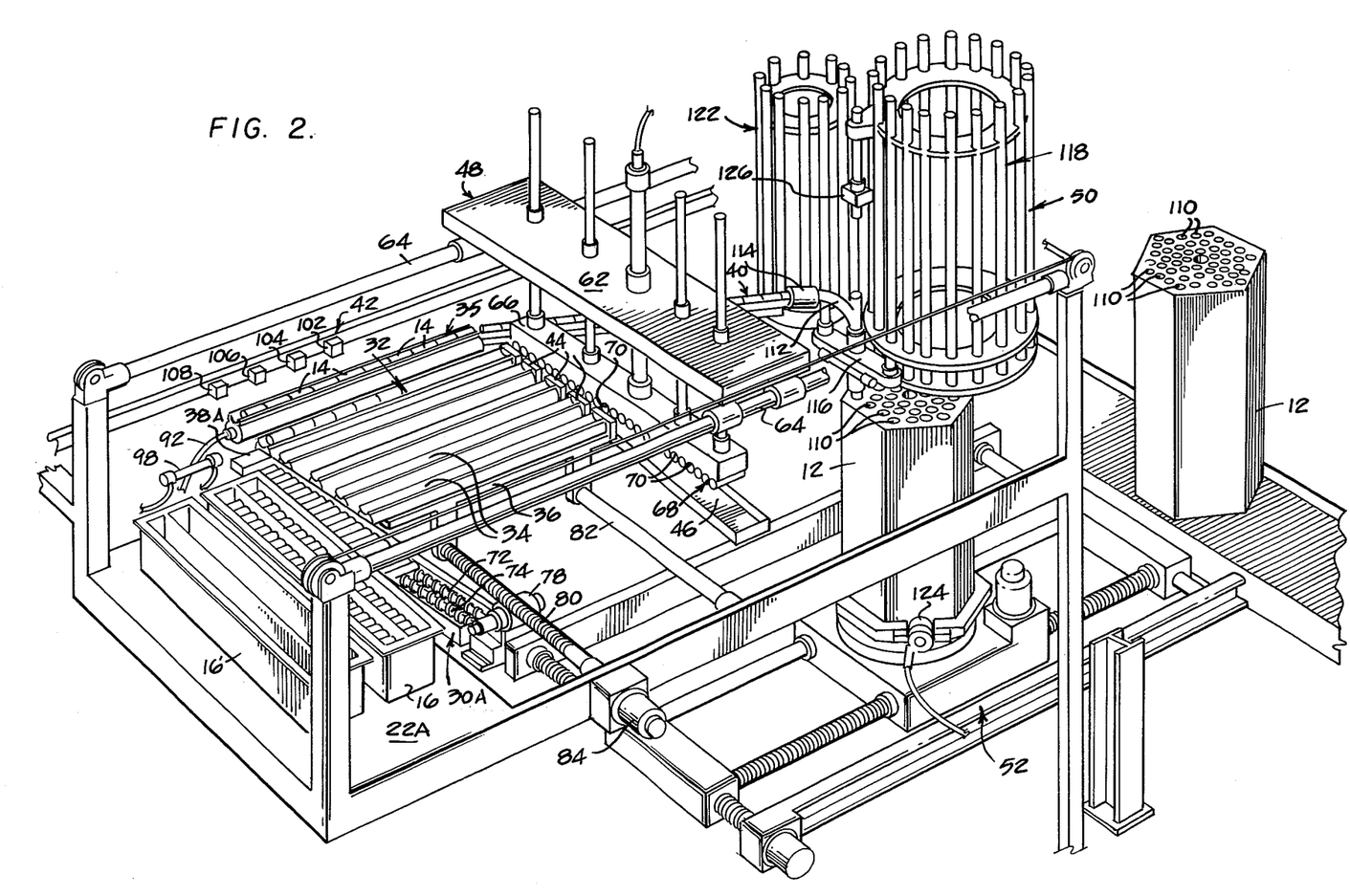
FIG. 2 is an enlarged view of a portion of the assembling apparatus of FIG. 1 with emphasis upon feeding and stacking assemblies which form an important portion of the apparatus.

Referring now to FIGS. 1 and 2, the fuel rods 14 are arranged in side-to-side layers within containers 16. The containers, each containing approximately 640 fuel rods, for example, are removed from the storage vault 10 by a container conveyor 18. It is important to note that the fuel rods in different containers may have different fuel blends as necessary for use in various reactors or within different portions of the same reactor.

The containers 16 are transferred between the container conveyor 18, an intermediate container storage area 20 and container unloading stations 22A and 22B by means of an overhead hoist unit 24. The hoist unit 24 is movable along a pair of transverse beams 26 which are in turn movable upon lateral rails 28. Accordingly, the hoist unit 24 may be programmed or controlled for placing any selected container from the intermediate storage area 20 at either of the unloading stations indicated at 22A and 22B.

The two unloading stations 22A and 22B are respectively associated with feed assemblies 30A and 30B. The feeding stations or assemblies are provided with fuel rods from the containers 16 in a manner described below.

A stacking assembly 32 includes a plurality of stacking troughs 34. The stacking troughs 34 are movable upon a common table 36 so that any one of the troughs 34 may be loaded with a stack 35 of longitudinally aligned fuel rods from either of the feed assemblis 30A and 30B under the regulation of respective control gates 38A and 38B. Each stack preferably includes eleven fuel rods but may also typically have eight, nine, ten or twelve fuel rods for example.

Similar movement of the stacking table 36 permits any one of the stacking troughs 34 to be aligned with a loading conveyor 40. When a stack of a selected number of fuel rods is in place upon one of the stacking troughs 34, a monitoring device 42 determines if the entire length of the particular stack is within acceptable limits. If the stack is of acceptable length, a stack control gate 44 for each stacking trough permits the entire stack to be transferred to the loading conveyor 40. If the length of the stack is not within acceptable limits, the stack control gate 44 causes the entire stack to be transferred to a reject collection trough indicated at 46.

To complete the initial summary of the stacking assembly 32 and the feed assemblies 30A and 30B, an overhead fuel rod manipulator 48 is associated with each of the feed assemblies 30A and 30B. Construction and operation of the manipulator 48 is described in substantial detail within the abovenoted copending reference and is operable either to transfer fuel rods from a full container 16 on one of the unloading stations 22A and 22B to the associated feed assembly or to transfer rejected fuel rods from the reject collection trough 46 to an empty container 16' also arranged at each of the container unloading stations 22A and 22B.

As each accepted stack of fuel rods is transferred to the loading conveyor 40, it is directed to a fuel element loading device indicated at 50. A preferred version of the fuel element loading device is described in detail within the other abovenoted copending reference and is operable for loading the accepted stacks of fuel rods into respective longitudinal passages within each of the fuel elements 12. As described within that case, the fuel element 12 is mounted upon a movable X-Y table 52 to permit controlled loading of fuel rod stacks into each of a plurality of longitudinal passages formed within the fuel elements. As described in detail within that reference and as summarized below, the loading device may also be employed to insert spacers into the fuel rod stacks and to arrange a plug in each of the longitudnal passages of the fuel elements after a fuel rod stack is placed therein.

After each fuel element 12 is completely loaded, a fuel element hoist 54 transfers the loaded fuel element to an interfacing "cure-in-place" system (not shown). After leaving the curing system, the fuel element may either be transferred to an intermediate storage area or may either be employed within a reactor. In any event, the fuel element hoist 54 then places an empty fuel element under the loading device 50 so that the entire assembling operation summarized above may take place again.

The assembling apparatus of the present invention includes a number of preferred features contemplated to facilitate and assure the proper loading of fuel rods into the fuel elements. For example, the construction and operation of the feeding assemblies 30A and 30B together with the stacking assembly 32 is of particular importance within the present invention. Also, the entire assembling apparatus may be operated by a programmed control unit generally located at 56.

Thus, the assembling apparatus of the present invention permits the stacking and loading of fuel rods into nuclear fuel elements with a number of advantages over similar existing units. In addition to the entire apparatus being operable as an automated system, the assembling apparatus may be employed to stack and load more than one specific blend of fuel rods at a time. This is made possible by the use of the two feeding assemblies 30A and 30B as will be discussed in greater detail below.

Operation of the assembly apparatus is made particularly efficient since different blends of fuel rods may be introduced into the system while the stacking and unloading is in process. Thus, the apparatus of the present invention may be employed to arrange, monitor and load up to as many as 250 fuel rod stacks (or 3000 individual fuel rods) per hour. This corresponds to the loading of approximately 1.9 fuel elements of the type contemplated per hour.

As indicated above, the assembling apparatus includes a particularly novel combination of elements within the feeding assembly and stacking assembly for receiving arrays of side-to-side arranged fuel rods and rapidly and efficiently transferring them into axially aligned stacks of a selected number of fuel rods, the stacks then being monitored to determine if their lengths are within satisfactory limits.

Finally, as was also indicated within the abovenoted reference, the loading device employs low level vibration to facilitate loading of the fuel rod stacks into the fuel elements.

The combination of the feeding assemblies and the stacking assembly for translating arrays of side-to-side arranged parts into axially aligned stacks may also be employed for handling or processing similar articles, for example, similarly shaped cylindrical parts.

The specific construction and function of certain of the subassemblies summarized above are set forth in greater detail below.

All portions of the assembling apparatus of the present invention are preferably operated under the control of the programmed or computer control unit 56. For example, the container conveyor 18 may be operated in conjunction with the overhead hoist unit 24 for placing containers having fuel rods of different fuel blends in selected locations of the intermediate container storage area 20. Under the same program, the overhead hoist unit 24 may subsequently be operated to retrieve a container with fuel rods of a different required fuel blend in order to meet programmed requirements for loading stacks of such fuel rods into the elements or blocks 12.

With a container 16 having fuel rods of a selected fuel blend in place upon each of the container unloading stations 22A and 22B, the fuel rod manipulators 48 may each be selectively operated in order to transfer a side-to-side array of fuel rods from the container 16 on the respective container unloading station onto one of the feed assemblies or troughs 30A and 30B. Each of the manipulators 48 includes a bridge 62 which is slidably mounted on rails 64 for traversal above the respective container unloading station, the respective feed assembly or trough and also one of the reject collection troughs 46. A manipulating hand 66 is suspended beneath each of the bridges 62 and may be raised and lowered as necessary for picking up or depositing an array of fuel rods. As described in substantial detail within the abovenoted reference, each manipulating hand 66 has a lower surface 68 with a series of conforming cylindrical recesses 70 which are adapted to engage an array of side-to-side fuel rods. Each manipulating hand 66 also includes vacuum means (not shown) for selectively maintaining the array of fuel rods in place upon the lower surface 68 of the manipulating hand 66. Accordingly, the manipulating hand 66 may be lowered into a compartment of the container 16 for picking up an array of as many as 40 fuel rods and depositing them upon one of the feed assemblies or troughs 30A and 30B. As indicated above, reject fuel rods may accumulate within the reject collection troughs 46. The manipulating hands 66 are also operable as necessary in order to retrieve the rejected fuel rods from the respective reject collection troughs 46 and place them in the empty container 16' on the respective container station 22A or 22B. The containers 16' may also be removed from the stations 22A and 22B as necessary in order to permit further processing or disposal of the rejected fuel rods.

The two feed assemblies or troughs 30A and 30B are of similar construction except that the feed assembly 30B is a mirror image of the feed assembly 30A. Accordingly, the following detailed description of the feed assembly 30A may also be considered applicable to the other feed assembly 30B.

Figures 3, 4:
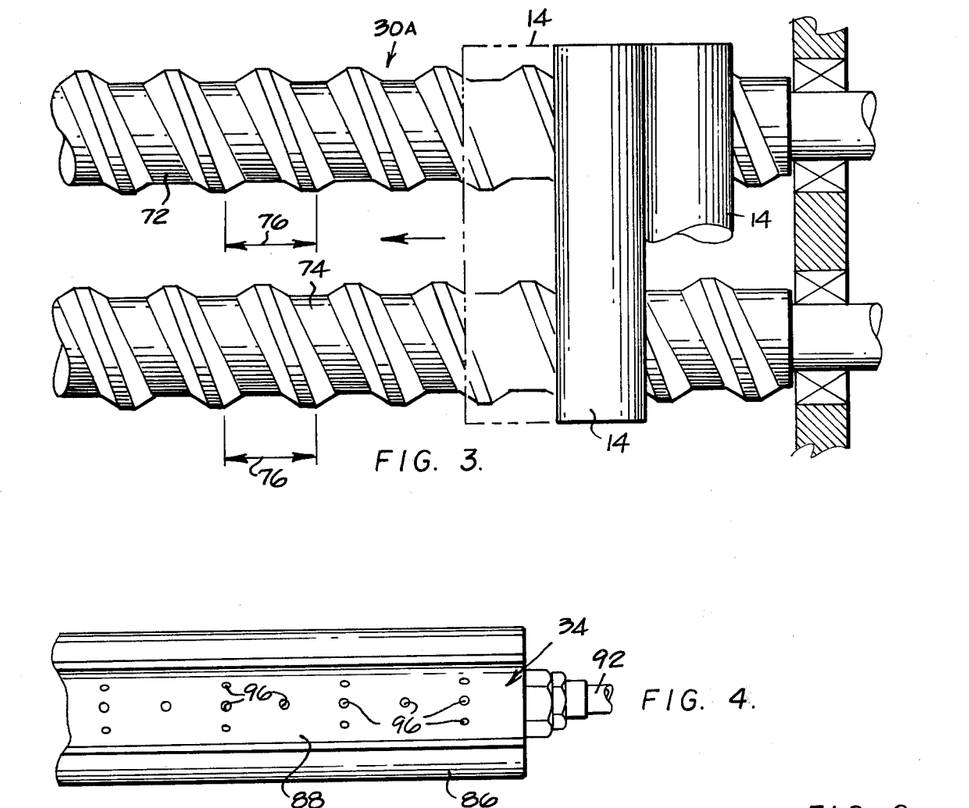
FIG. 3 is a fragmentary view of a pair of screw members forming one feeding trough within the apparatus.
FIG. 4 is an enlarged fragmentary view of one stacking trough within the stacking assembly.

The feed assembly 30A may be best seen in the fragmentary view of FIG. 3 and includes a pair of screw members 72 and 74. The screw members 72 and 74 are formed with helical threads having a thread pitch 76 approximately equal to the diameter of the fuel rods 14. For example, it is particularly contemplated within the handling assembly of the present invention that the diameter of the fuel rods 14 and the thread pitch 76 are approximately 0.75 inches or 1.905 centimeters. In addition, the threads on the screw members 72 and 74 are formed identical to each other. The two screw members thus form a stable support for the array of fuel rods with the fuel rods being moved laterally by simultaneous rotation of the screw members 72 and 74 in the same direction. The direction of rotation of the screws is such that the fuel rods ride along the right edge of feed troughs 30A and 30B.

The screw members 72 and 74 or at least the raised thread portions thereof are preferably formed from a suitable plastic or other resilient or soft material in order to prevent damage to the fuel rods while assuring their positive transport along the feed trough.

The feed control gates 38A and 38B are also of similar construction and operation except that they are mirror images adapted for opposed operation in conjunction with the respective feed troughs 30A and 30B. Accordingly, the following description for the feed control gate 38A also applied to the feed control gate 38B.

The feed control gate 38A is of a conventional air pinch valve type equipped with a photoelectric counting capability so that a selected number of fuel rods from the feed trough 30A may be transferred to one of the stacking troughs 34 which is in alignment therewith.

The feed control gate 38A as well as a motor means 78 for driving the screw members 72 and 74 of the feed trough 30A are both controlled by the computer unit 56. Preferably, operation of the feed control gate 38A is synchronized with operation of the feed trough 30A so that fuel rods are supplied to the feed control gate 38A at the same rate that the feed control gate directs them into the appropriate stacking trough 34. The feed control gate 38A accomplishes two important functions in determining the number of fuel rods which are placed in the respective stacking trough 34 at one time and shifting the fuel rods from a side-to-side array into alignment in the stacking trough. After the feed control gate 38A has served to direct and the screws have fed a selected number of fuel rods into the stacking trough 34, rotation of the screw members 72 and 74 in the feed trough 30A may be stopped until the feed control gate 38A is directed by the programmed control unit 56 to direct a stack of fuel rods into another stacking trough.

As indicated above, the stacking assembly 32 includes a plurality, preferably eleven, stacking troughs 34 which are movably mounted upon the common stacking table 36. The stacking table 36 is movably supported by a threaded drive shaft 80 and a parallel guide 82. The drive shaft 80 is driven in rotation by a suitable motor 84 in order to shift the stacking table 36 and align the respective stacking troughs 34 with the feed control gates 38A and 38B as well as the loading conveyor 40. In this manner, either or both of the feed assemblies 30A and 30B may be operating to direct stacks of fuel rods into respective stacking troughs while a complete fuel rod stack is being simultaneously transferred to the loading conveyor 40.

Figure 5:
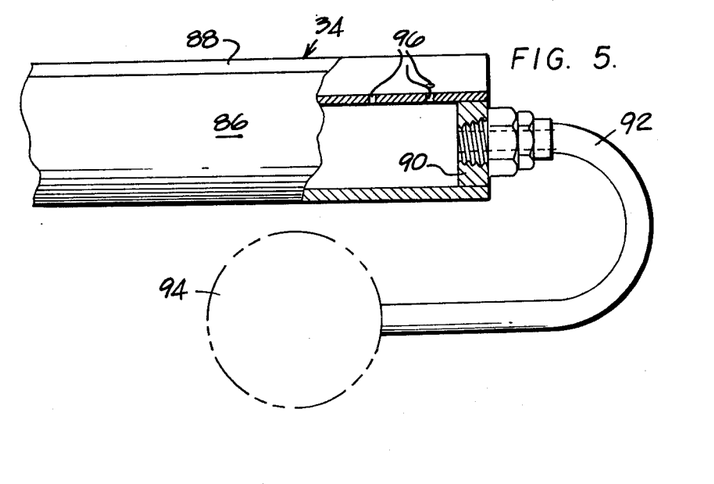
FIGS. 5 and 6 are respectively an elongated side view and an end view of the stacking trough of FIG. 4.
Figure 6:
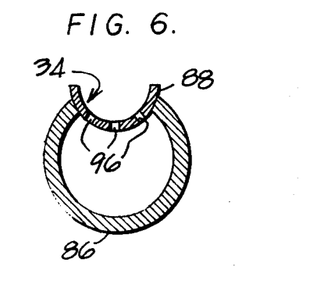

The fuel rods are supported and moved along the stacking troughs upon a cushion of air. The stacking troughs 34 are of similar construction and may be best seen in FIGS. 4–6. Having reference to those figures, each of the stacking troughs 34 is formed by a tubular pipe 86. A circumferential portion of the pipe is removed along its entire length in order to receive a smaller tube 88 which is split approximately in half to form a concave channel for receiving the fuel rods. Accordingly, the diameter of the tube 88 is selected to be approximately the same as or slightly larger than the diameter of the fuel rods. The tube 88 is secured to the opening in the pipe 86 by means of welding or adhesive bonding in order to develop a pneumatic seal. The ends of the pipe 86 are also sealed, one end of the pipe being closed by a plug 90 adapted to receive a flexible tubing 92 for connecting the interior of the pipe 86 with an air supply conduit 94.

As may be best seen in FIG. 4, small holes 96 are drilled along the length of the smaller tube 88. The holes 96, having a diameter of approximately 0.032 inches or 0.081 centimeters, for example, tend to form restrictions through which air or fluid from the interior of the pipe 86 may escape in order to form a thin air film or cushion for supporting the fuel rods. With air or fluid under pressure being introduced into the pipe 86 from the supply conduit 94 and with the stacking trough being inclined slightly downwardly in the direction of the loading conveyor 40, the fuel rods tend to float along each of the stacking troughs from the feed control gates 38A and 38B toward the stack control gates 44 adjacent the loading conveyor 40.

After a selected number of fuel rods has been directed into one of the stacking troughs by the feed control gate 38A, a pneumatic ram 98 mounted adjacent the feed control gate 38A is operated to assure that all of the fuel rods in the stack are abutted with each other and with the stack control gate 44. The length of the entire fuel rod stack may then be accurately determined by the monitoring device 42.

The monitoring device 42 comprises a number of optical fibre sensors 102, 104, 106 and 108 which are mounted above the stacking troughs 34 in alignment with the feed control gate 38A.

The optical sensors are respectively spaced apart from the stack control gate 44 and from each other to measure stacks of different numbers of fuel rods. For example, the spacing of the optical sensors 102-108 from the stack control gate 44 may correspond respectively to the length of nine, 10, 11 or 12 axially aligned fuel rods. The sensors 102-108 are also coupled with the programmed control unit 56. Accordingly, it may be immediately determined whether or not the overall length for each fuel rod stack is within acceptable limits.

The stacking table is thereafter shifted so that the monitored stack of fuel rods in the stacking trough 34 is aligned with the loading conveyor 40. If the overall length of the fuel rod stack is within acceptable limits, the respective stack control gate 44 permits the fuel rods to pass to the loading conveyor 40 which directs them to the loading device 50 for insertion into one of the longitudinal passages 110 in the element or block 12. If the overall length of the fuel rod stack is not within acceptable limits, the stack control gate 44 directs the fuel rods onto the reject collection trough 46. The reject collection trough 46 is also slightly inclined so that the fuel rods tend to be positioned in side-to-side relation and in alignment with the appropriate fuel rod manipulator 48.

The stack control gates 44 are also controlled by the control unit 56. Accordingly, the unit 56 may be programmed so that each of the stack control gates 44 directs the fuel rods either to the loading conveyor 40 or the reject collection trough 46 depending upon measurement of the fuel rod stack length by one of the optical sensors 102-108.

As indicated above, the loading device 50 which is a portion of the assembling apparatus of the present invention is disclosed in detail within the above noted reference. Accordingly, the loading device 50 is described below only for the purpose of setting forth its function as a subassembly within the present invention.

The loading conveyor 40 directs the stack of fuel rods toward a pneumatic loading chute 112 past a loading control gate 114. The loading control gate releases the individual fuel rods in each stack one at a time into the loading chute. As indicated above, a fuel element or block 12 is supported upon the X-Y table 52 which is also under control of the unit 56 so that the individual longitudinal passages 110 may be selectively aligned with the loading chute 112.

A spacer and plug feed slide 116 is also arranged along the loading chute 112 and controlled by the unit 56 for inserting spacers as desired between fuel rods. For example, spacers are commonly inserted between alternate fuel rods in order to adjust the overall length of the fuel rod stack. Accordingly, the loading device 50 further includes a spacer feed turret 118 having a plurality of storage columns 120 for supplying the spacers to the spacer and plug feed slide 116.

The feed slide 116 is also employed to insert plugs into each of the longitudinal passages 110 after a stack of fuel rods is placed therein. The loading device 50 also includes a similar plug feed turret 122 for supplying plugs to the spacer and plug feed slide 116.

After a complete fuel rod stack including fuel rod spacers has been inserted into one of the longitudinal passages, the spacer and plug feed slide 116 receives a plug from the plug feed turret 122 and drops the plug through the loading chute into the longitudinal passage. A pneumatic ram 126 mounted adjacent the loading chute 112 and feed slide 116 is then lowered through the loading chute in order to verify full insertion of the fuel rod stack into the passage. Thereafter, the X-Y table indexes the block 12 to position the next selected longitudinal passage 110 beneath the loading chute.

As described in greater detail within the abovenoted reference the X-Y table 52 which supports the individual fuel elements 12 may be positioned to align all of the individual longitudinal passages 110 with the loading chute 112. The X-Y table is also equiped with vibrator means 124 to facilitate loading of the fuel rods into the passages 110 without requiring perfect alignment between the loading chute 112 and the individual passages.

After the fuel rod stacks have been inserted into all of the longitudinal passages in a fuel element, the fuel element is removed by the hoist 54 as discussed above and replaced by another fuel element to be loaded with stacks of fuel rods.

Returning to the stacking assembly 32, it is noted that the large number of stacking troughs 34 permit versatility in the mode of operation for the assembling apparatus of the present invention. For example, as indicated above, both of the feed assemblies 30A and 30B may be directing fuel rods into respective stacking troughs while an additional fuel rod stack of monitored length is being directed to the loading conveyor 40. However, with the additional stacking troughs available, either one of the feed assemblies may be employed alone for supplying all of the fuel rods necessary to form fuel rod stacks. Thus, if fuel rods having two different blends are required for loading of a single fuel element 12, the two feed assemblies 30A and 30B may be supplied by the hoist unit 24 with containers having fuel rods of the two different blends. Such a function may of course be controlled by the unit 56. Operation of the two feed assemblies 30A and 30B may then be regulated in order to provide the appropriate mix of fuel blends for the fuel element 12.

If it should be necessary to load more than two fuel blends, the assembling apparatus may similarly be adapted to load the two different fuel blends by the two feed assemblies 30A and 30B. Subsequently, at least one of the feed assemblies may be shut down and supplied with yet another fuel blend while the other feed assembly continues operation.

It would of course also be possible within the contemplated scope of operation for the assembling apparatus of the present invention to provide additional feed assemblies, if necessary, in order to supply the required variety of fuel blends.

Similar modifications in other portions of the assembling method and apparatus are also contemplated within the scope of the present invention. Accordingly, the scope of the present invention is to be defined only by the following appended claims.

What is claimed is:

1. A nuclear fuel element assembling apparatus having a loading device for introducing stacks of axially aligned fuel rods into each of a plurality of longitudinal passages in a fuel element and comprising
    a conveyor for receiving the plural stacks of axially aligned fuel rods and transferring them to the loading device,
    a reject collection means,
    a stacking assembly including
        a movable table forming a plurality of stacking troughs each in parallel alignment with the conveyor, the table being movable for selective alignment of each stacking trough with the conveyor,
        means for monitoring the length of each stack of fuel rods in the stacking troughs for determining if the stack-length is within acceptable limits, and
        gate means operating in conjunction with the movable table for alternatively directing the stack of fuel rods within a stacking trough to the conveyor means if within an acceptable length range and for otherwise directing the stack of fuel rods to the reject collection means, and,
    multiple feed means for separately feeding selected numbers of fuel rods into the respective stacking troughs to form complete fuel rod stacks.

2. The nuclear fuel element assembling apparatus of claim 1 wherein each stacking trough comprises an elongated member having a concave shape for receiving the stacks of fuel rods and further comprising means for producing a fluid cushion to support the fuel rods in floating relation upon the concave member.

3. The nuclear fuel element assembling apparatus of claim 2 wherein each of the stacking troughs is inclined slightly downwardly toward the conveyor means so that the fuel rod supported in floating relation upon the fluid cushion tends to move toward the conveyor means.

4. The nuclear fuel element assembling apparatus of claim 3 wherein each stacking trough includes an elongated internal chamber, the elongated concave member being penetrated by openings in communication with the internal chamber, and further comprising pneumatic means in communication with the internal chamber for introducing air under pressure into the chamber, the air escaping through the openings in the convex member to form the fluid cushion for the fuel rods.

5. The nuclear fuel element assembling apparatus of claim 1 further comprising ram means associated with the stacking troughs for axially engaging the stack of fuel rods supported by the respective stacking trough in order to assure that the fuel rods are in axially abutting relation while being measured by the monitoring means.

6. The nuclear fuel element assembling apparatus of claim 5 wherein the monitoring means comprises a plurality of optical sensors for respectively measuring the length of fuel rod stacks having different numbers of fuel rods.

7. The nuclear fuel element assembling apparatus of claim 1 wherein the monitoring means comprising a plurality of optical sensors for respectively measuring the length of fuel rod stacks having different numbers of fuel rods.

8. A nuclear fuel element assembling apparatus being operable under programmed control means for receiving containers each including a large number of fuel rods and for introducing stacks of axially aligned fuel rods into each of a plurality of longitudinal passages in a nuclear fuel element, comprising
    a feed trough means,
    transfer means for transferring an array of side-to-side aligned fuel rods into the feed trough means,
    a plurality of stacking trough means being movable relative to the feeding trough means for selective alignment of the respective stacking troughs therewith,
    means for regulating the passage of a selected number of fuel rods from the feeding trough means to one of the stacking trough means,
    loading trough means also being arranged for alignment with the movable stacking trough means,
    monitoring means being associated with the stacking trough means for monitoring the length of stacks of fuel elements in the stacking troughs,
    gate means operable in conjunction with said movable stacking trough means being responsive to the monitoring means for directing fuel rod stacks of acceptable length to the loading trough means and for otherwise directing the fuel rod stacks to a reject collection means, and
    a fuel rod loading device for receiving the stacks of the fuel rods from the loading trough means and loading them into the longitudinal passages of the nuclear fuel elements.

9. The nuclear fuel element assembling apparatus of claim 8 wherein the feed trough means comprises a pair of threaded screw members arranged in parallel relation with opposed threads, each of the screw members having a thread pitch approximately equal to the diameter of the fuel rods.

10. The nuclear fuel element assembling apparatus of claim 9 wherein each of the loading trough means comprises an elongated member being of concave shape for receiving the fuel rods, the concave member having small openings in communication with a source of fluid under pressure for producing a fluid cushion to support the fuel rods and further comprising means for urging the fuel rods toward the loading trough means.

11. The nuclear fuel element assembling apparatus of claim 10 wherein the monitoring means comprises a plurality of optical sensors being spaced apart from each other for monitoring the length of fuel rod stacks formed by different numbers of fuel rods.

12. The nuclear fuel element assembling apparatus of claim 8 wherein the monitoring means comprises a plurality of optical sensors being spaced apart approximately equal to the length of individual fuel rods for monitoring the length of fuel rod stacks formed by different numbers of fuel rods.

13. The nuclear fuel element assembling apparatus of claim 12 wherein the monitoring means comprises a plurality of optical sensors being spaced apart from each other for monitoring the length of fuel rod stacks formed by different numbers of fuel rods.

14. A stacking apparatus for receiving arrays of cylindrical parts in side-to-side relation and arranging them in axially aligned stacks of selected lengths and/or numbers of parts, comprising:
   a feed trough means for receiving the cylindrical parts in side-to-side arrangement,
   the feed trough means including a pair of parallel screw members, the screw members having helical thread means with a thread pitch approximately equal to the diameter of the cylindrical parts, the screw members being rotatable in unison for shifting the cylindrical parts,
   a stacking assembly including table means forming a plurality of stacking troughs each extending parallel to the axis of the cylinder parts,
   gate means for regulating the passage of individual cylindrical parts from the feed trough means into end-to-end relation upon a selected stacking trough means,
   monitoring means associated with the stacking assembly for inspecting the stacks of axially aligned cylindrical parts, and
   means for receiving the inspected stacks of cylindrical parts from the respective troughs in the stacking assembly,
   the table means of the stacking assembly being movable for selectively aligning the respective stacking troughs with the gate means and the receiving means.

15. The stacking apparatus of claim 14 wherein each stacking trough comprises an elongated member being of concave shape for receiving the fuel rods, the concave member having small openings in communication with a source of fluid under pressure for producing a fluid cushion to support the fuel rods and further comprising means for urging the fuel rods toward the loading trough means.

16. The stacking apparatus of claim 15 wherein the monitoring means comprises a plurality of optical sensors being spaced apart from each other for monitoring the length of fuel rod stacks formed by different numbers of fuel rods.

17. In a method for receiving arrays of fuel rods in side-to-side relation, arranging them in axially aligned stacks of selected lengths and/or numbers of parts for loading into longitudinal passages of nuclear fuel elements, the steps comprising
   laterally moving the fuel rods in side-to-side relation along a feed path,
   individually and longitudinally directly single fuel rods onto a stacking path arranged perpendicular to the feeding path for forming stacks having a selected number of axially aligned fuel rods,
   monitoring the length of the stack of fuel rods,
   directing the stacks of fuel rods toward a loading conveyor line if the length of the stack is within acceptable limits and otherwise directing the stack of fuel rods to a reject collection site, and
   receiving the accepted stack of fuel rods from the loading conveyor line and loading them into the longitudinal passages of the fuel element.

18. The method of claim 17 wherein two similar feed lines are employed for directing fuel rods onto two separate stacking lines and subsequently aligning the respective stacking lines with the loading conveyor lines for transferring accepted stacks of fuel rods thereto.

19. The method of claim 18 wherein at least three stacking troughs are provided to form the stacking lines, the stacking lines being movable for alignment with the feed lines and the loading conveyor line.

20. The method of claim 19 wherein the fuel rods are moved along the stacking line while being supported by a fluid cushion.

21. The method of claim 18 wherein fuel rods having different properties are supplied to the two feed lines.

22. The method of claim 17 wherein the fuel rods are moved along the feed line by screw members each having a thread pitch approximately equal to the diameter of the fuel rods.

23. The method of claim 17 wherein the fuel rods are moved along the stacking line while being supported by a fluid cushion.

* * * * *

UNITED STATES PATENT AND TRADEMARK OFFICE
CERTIFICATE OF CORRECTION

PATENT NO. : 4,066,534
DATED : January 3, 1978
INVENTOR(S) : Arya

It is certified that error appears in the above-identified patent and that said Letters Patent are hereby corrected as shown below:

Column 3, line 30   "assemblis" should be --assemblies--.

Column 4, line 13   delete "either" after "may".

Column 12, line 10  "directly" should be --directing--.

Signed and Sealed this

Fifteenth Day of August 1978

[SEAL]

Attest:

RUTH C. MASON
Attesting Officer

DONALD W. BANNER
Commissioner of Patents and Trademarks